United States Patent [19]

Djupsjöbacka et al.

[11] Patent Number: 5,446,574
[45] Date of Patent: Aug. 29, 1995

[54] SYSTEM AND METHOD FOR DISPERSION COMPENSATION IN FIBRE OPTIC HIGH SPEED SYSTEMS

[75] Inventors: Anders G. Djupsjöbacka, Solna; Lars Egnell, Saltsjöbaden, both of Sweden

[73] Assignee: Telefonaktiebolaget LM Ericsson, Stockholm, Sweden

[21] Appl. No.: 217,634

[22] Filed: Mar. 25, 1994

[30] Foreign Application Priority Data

Mar. 26, 1993 [SE] Sweden .................... 9301023

[51] Int. Cl.⁶ ........................................... H04B 10/04
[52] U.S. Cl. .................................... 359/181; 359/161; 359/151; 375/229; 333/18
[58] Field of Search ............... 359/151, 154, 161, 173, 359/181–182, 188; 375/11; 333/18, 28 R; 328/162; 364/724.01

[56] References Cited

U.S. PATENT DOCUMENTS

| 4,658,224 | 4/1987 | Thylén et al. | 359/245 |
| 5,055,795 | 10/1991 | Kasper et al. | 359/161 |
| 5,305,350 | 4/1994 | Budin et al. | 359/161 |

FOREIGN PATENT DOCUMENTS

| 256809 | 2/1988 | European Pat. Off. |
| 428151 | 5/1991 | European Pat. Off. |
| 464812 | 1/1992 | European Pat. Off. |
| 475376 | 3/1992 | European Pat. Off. |
| 482461 | 4/1992 | European Pat. Off. |
| 524758 | 1/1993 | European Pat. Off. |

OTHER PUBLICATIONS

A. Djupsjöbacka, "Residual Chirp in Integrated-Optic Modulators," *IEEE Photonics Tech. Lett.* vol. 4, No. 1, pp. 41–43 (Jan. 1992).

A. H. Gnauck et al., "Dispersion Penalty Reduction Using an Optical Modulator with Adjustable Chirp," *IEEE Photonics Tech. Lett.* vol. 3, No. 10, pp. 916–918 (Oct. 1991).

H. Gysel et al., "Electrical Predistortion to Compensate for Combined Effect of Laser Chirp and Fibre Dispersion," *Elec. Lett.* vol. 27, No. 5, pp. 421–423 (Feb. 28, 1991).

N. Henmi et al., "10-Gb/s, 100-km Normal Fiber Transmission Experiment Employing a Modified Prechirp Technique," *Proc: OFC 91*, paper Tu02 (1991).

H. Isadpanah et al., "Multiwavelength Dispersion-Compensation for 1550 nm Transmission at 2.5 and 10 Gb/s Over 1310 nm-Optimized Single-Mode Fiber," *Proc: EPOC '92*, paper TuA5.1 (1992).

T. L. Koch et al., "Dispersion Compensation by Active Predistorted Signal Synthesis," *J. of Lightwave Technology* vol. LT-3, No. 4, pp. 800–805 (Aug. 1985).

S. K. Korotky et al., "High-Speed, Low Power Optical Modulator with Adjustable Chirp Parameter," *Integrated Photonics Research*, pp. 53–54 (1991).

F. Koyama et al., "Frequency Chirping in External Modulators," *J. of Lightwave Technology* vol. 6, No. 1, pp. 87–93 (Jan. 1988).

M. S. Lin et al., "Nearly Dispersion-Penalty-Free Transmission Using Blue-Shifted 1.55-μm Distributed Feedback Lasers," *IEEE Photonics Tech. Lett.* vol. 2, No. 10, pp. 741–742 (Oct. 1990).

(List continued on next page.)

*Primary Examiner*—Leo H. Boudreau
*Assistant Examiner*—Kinfe-Michael Negash
*Attorney, Agent, or Firm*—Burns, Doane, Swecker & Mathis

[57] ABSTRACT

A system and a method for dispersion compensation in fiber optic high speed systems, the dispersion compensation being carried out in the transmitter. The system comprises a modulating device for modulating an information-carrying electric signal, an equalizing device for equalizing the signal modulated in the modulation device, and an electro-optic translating device for translating the signal equalized in the equalizing device into an optical signal substantially without loss of information and with substantially maintained phase and amplitude properties.

26 Claims, 3 Drawing Sheets

OTHER PUBLICATIONS

C. M. Miller, "Characteristics and Applications of High Performance Tunable, Fiber Fabry-Perot Filters," *Proc: ECTC '91* (1991).

T. Okiyama et al., "10 Gb/s Transmission in Large-Dispersion Fiber Using a Ti:LiNbO$_3$ Mach-Zehnder Modulator," *Proc: IOOC '89*, paper 20D4-5 (1989).

J. J. O'Reilly et al., "Microstrip Compensation of Mibre Chromatic Dispersion in Optically Amplified Coherent Systems," *IEE Colloquium on Microwave Optoelectronics*, No. 139, pp. 13/1-13/6 (1990).

T. Saito et al., "Prechirp Technique for Dispersion Compensation for a High-Speed Long-Span Transmission," *IEEE Photonics Tech. Lett.* vol. 3, No. 1, pp. 74-76 (Jan. 1991).

L. Thylén et al., "Bandpass Response Traveling-Wave Modulator with a Transit Time Difference Compensation Scheme," *J. of Lightwave Technology* vol. LT-3, No. 1, pp. 47-51 (Feb. 1985).

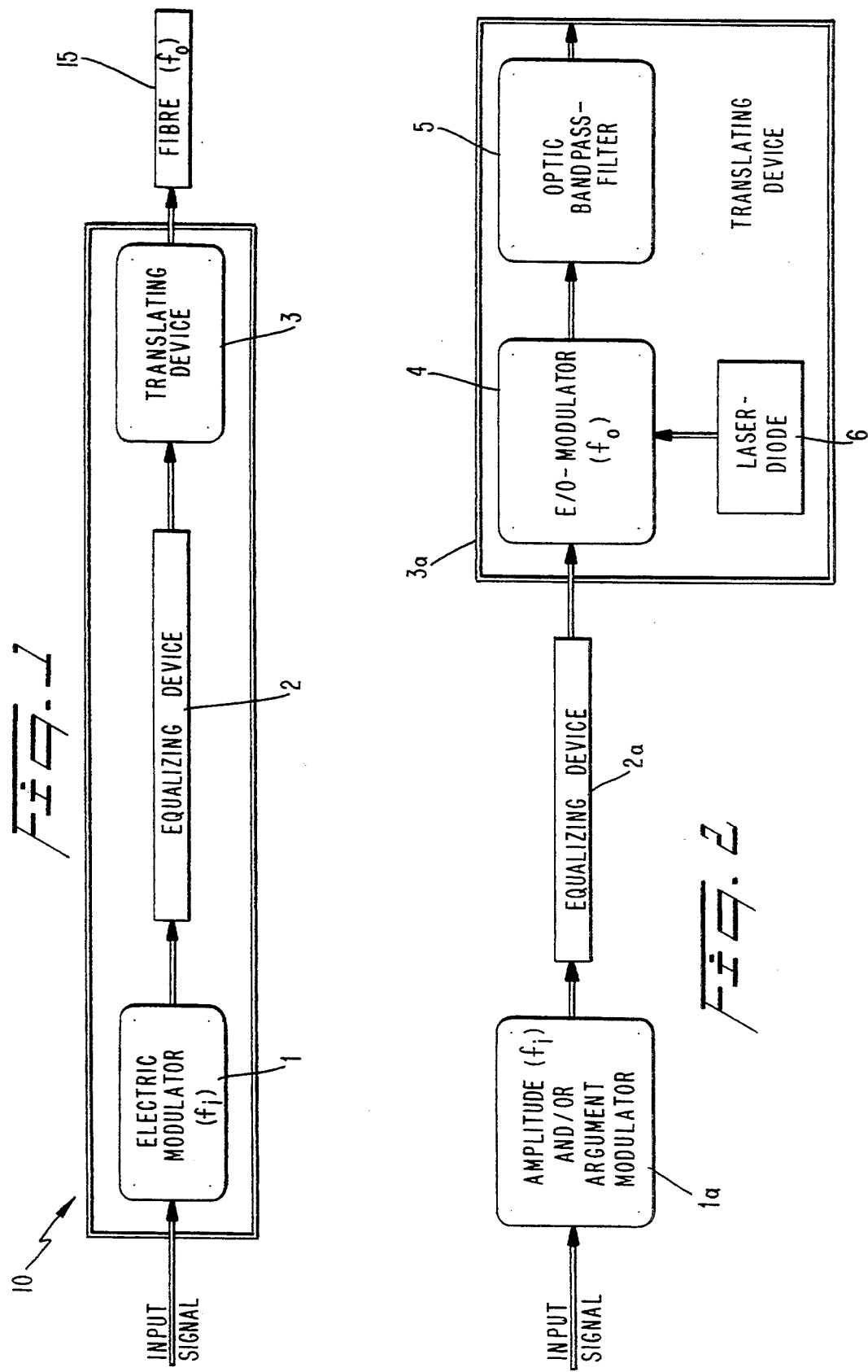

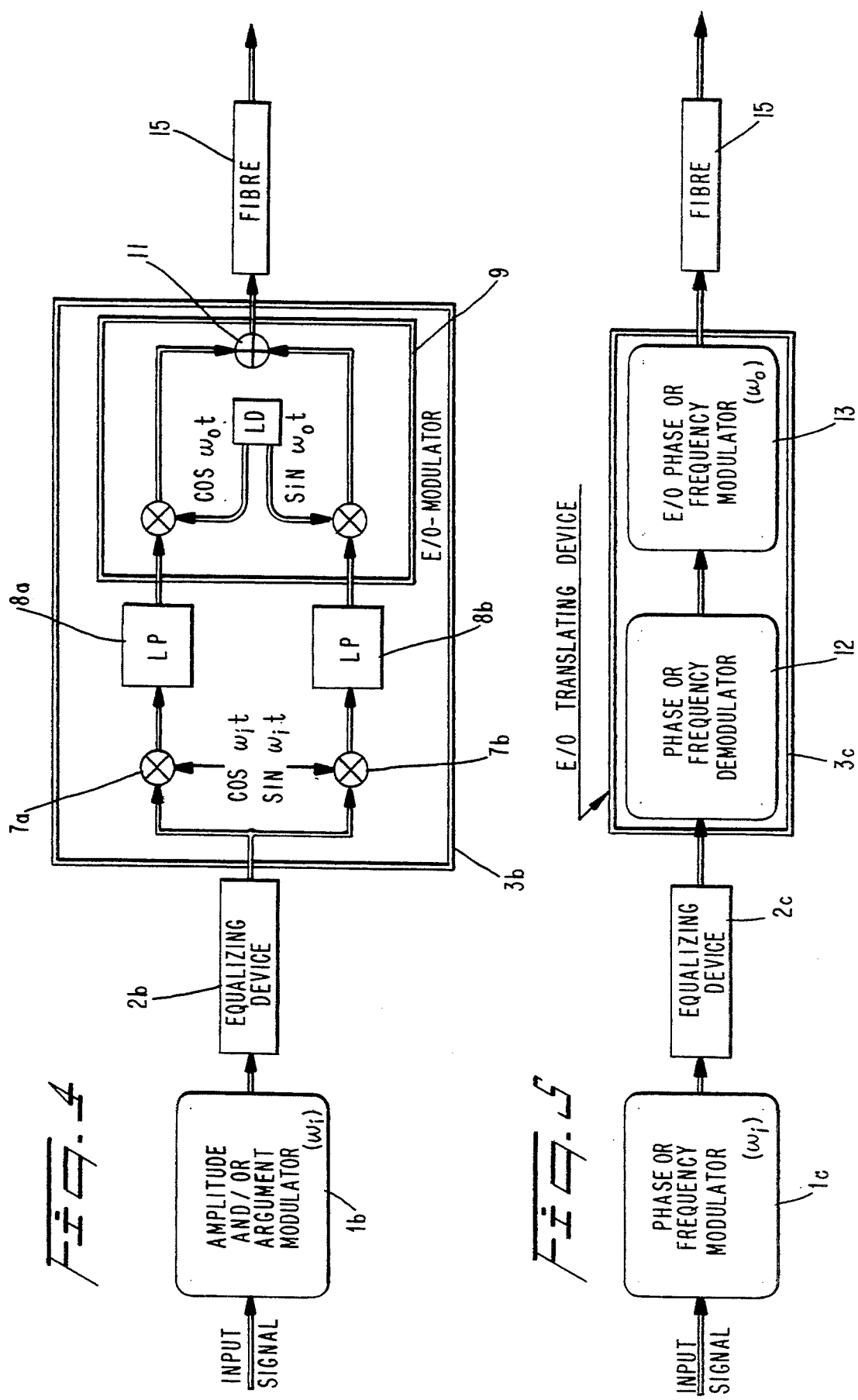

SYSTEM AND METHOD FOR DISPERSION COMPENSATION IN FIBRE OPTIC HIGH SPEED SYSTEMS

BACKGROUND

The present invention relates to a system and a method respectively for dispersion compensation in fibre optic high speed systems. Fibre optic high speed systems are being used in various communication applications, for instance in telecommunication over long transmission distances. A telecommunication network can be divided into separate levels such as for instance subscriber networks, regional networks and inter-regional networks or national networks. These national networks can for instance exist between different cities where there is a demand for very high transmission speeds, for instance 2,5 Gbit/s. However, a limitation in transmission speed between transmitter and receiver occurs due to dispersion. Dispersion is particularly a problem from 2,5 Gbit/s and upwards and at 10 Gbit/s it constitutes a fundamental limitation due to the fact that even the information band width gives rise to a limitation. In conclusion, the dispersion causes problems at high speeds and long distances. The importance of the dispersion thus increases at bit rates of over 2,4 Gbit/s in ordinary single-mode fibres for wavelengths of around 1,55 $\mu$m. At repeater-distances of approximately 60 kilometers the effect becomes noticeable at approximately 10 Gbit/s. The demands on analog and digital systems respectively will be partly different due to, amongst other things, the fact that a good linearity is essential in analog systems while it is of minor importance in digital systems.

A number of different systems for dispersion compensation of fibre optic high speed systems have been proposed. A frequently used system is based upon so called prechirp-generation which normally means that the laser is frequency/wavelength modulated during each pulse. Similar systems are described in for instance T. L. Koch, R. C. Alferness, "Dispersion Compensation by Active Predistorted Signal Synthesis". J. of Lightwave Technology, Vol. LT-3, No. 4, (1985), pp 800–805. At 1,05 $\mu$m and for an ordinary single-mode fibre it is required that the signal should blue-shift. By direct modulation, a laser normally red-shifts during the pulse. In general, the laser is FM modulated for obtaining the chirp after which the AM modulation is applied by means of an external modulator. In for instance N. Henmi, T. Saito, M. Yagamushi, S. Fujita, "10-Gb/s 100 km normal fiber transmission experiment employing a modified prechirp technique", Proc: OFC'91, (1991), paper Tu02, it is described how selected DFB lasers are utilized. With a so called blue-shift modulation in the transmitter, for instance described in F. Koyoma, K. Iga, "Frequency Chirping in External Modulators, J. of Lightwave Technology", Vol. LT-6, No. 1, (1988), pp 87–93, the FM/AM modulated signal is obtained in an external modulator, the laser functioning without any influence. The required modulation is normally obtained through a special design of the external modulator. Neither a so called prechirp generation nor a blue-shift modulation in the transmitter are in a real sense dispersion-modulating, but instead use the dispersion to bring about a pulse compression. Both of these kinds of systems are mainly used in digital systems where the effect is concentrated towards the middle of the bit gap at the expense of the linearity which, as has been mentioned above, does not have such a great importance in digital systems. The energy of the signal is thus concentrated towards the centre of the bit gap. However, the side-bands in the modulated signal are distorted. Furthermore, a system or a method of this kind implies that the pulse amplitude never becomes so high that the nonlinear range of the medium is entered.

The methods are usually suitable for digital systems providing that the distances generally are not greater than approximately 75 kilometers and the bit rate does not exceed approximately 10 Gbit/s. In conclusion it can be said that the frequency spectrum is distorted in such a way that the pulses in the fibre converge. The system, or the method, is not suitable in analog systems where a greater transmission distance is obtained at the expense of the linearity which is of importance in analog systems.

In accordance with another known system, the transmission is made dispersion-free by introducing an additional length of fibre in which the dispersion has a reversed sign. This is described in for instance H. Izadpanah et al, "Multiwavelength Dispersion Compensation for 1660 nm Transmission at 2,5 Gb/s Over 1310 nm Optimized Single-Mode Fiber", Proc: EPOC'92, (1992), paper TuA5.1. Through this, a real dispersion compensation is obtained in contrast to the above-mentioned method. The system is based on phase compensation of the frequency spectrum of the received signal, and the phase compensation counteracts the phase difference obtained by the different partial frequencies in the laid-out fibre. The dispersion compensation is carried out in the optic domain and is normally achieved by combining different fibre lengths with different signs of the dispersion, after which the transmission medium will become dispersion-free and the optic signal can be detected in a normal way.

Systems where an already laid-out dispersive fibre is being used involve a dispersion compensating fibre having to be arranged before the receiver. The compensating fibre length may be approximately one third of the transmission distance. This results in a number of disadvantages since the extra fibre or fibre length is costly, requires a special design and since it adds attenuation. In the above-mentioned document the losses are limited by adding a fibre amplifier between the transmission fibre and the dispersion compensation fibre, which further complicates the system and raises its cost.

In accordance with another known system, for instance described by J. J. O'Reilly, M. S. Chauldry; "Microstrip Compensation of fibre Chromatic Dispersion in Optically Amplified Coherent Systems in IEE Colloquium on Microwave Optoelectronics, No. 139, (1990), pp 13/1–13/6, the signal is likewise dispersion-compensated at the receiving side. In this way also, a true dispersion compensation is achieved and the system is based upon phase compensation of the frequency spectra of the received signal which counteracts the phase difference obtained by the different partial frequencies in the laid-out fibre. This system requires a coherent technique in the receiver which is also relatively complex and expensive. In the described document the phase distortion is taken care of at an intermediate frequency. A mixer is arranged which consists of an optic direction coupler which is fed by a signal and local oscillator, a detector diode and a bandpass filter and which only lets through the difference frequency. The phase correcting element consists of a microstrip conductor which has a normal dispersion; the microstrip conductor can for instance be 10–20 cm long and compensate for the dispersion in a fibre of a couple of hundred kilometers. When the phase distortion is compensated, the electrical signal is detected by means of traditional methods.

SUMMARY

The object of the present invention is to define a system and a method respectively for, as far as possible, eliminating the influence of dispersion in fibre optic high speed systems. Furthermore, it is an object to define a system which is cheap and as simple and safe as possible. It is also an object to define a system and a method respectively in which very long transmission distances and very high transmission speeds are possible. An additional object is not to have to extend the fibre in order to achieve a dispersion compensation, together with the objective that it should not be necessary to add or to have a large number of optic amplifiers in order to compensate for an additional attenuation.

A system by which these and other objects are achieved is a system for dispersion compensation in fibre optic high speed systems where the dispersion compensation is carried out in the transmitter the system comprises a modulating device for modulating an information carrying electric signal, an equalizing device for equalizing the signal being modulated in the modulating device and an electro-optic translating device or translator for translating the signal being equalized in the equalizing device to an optic signal, essentially without loss of information and with essentially maintained phase and amplitude properties. A method through which the objects are achieved is a method for dispersion compensation in which the dispersion compensation is carried out in the transmitter, an information carrying electric signal being modulated, the modulated signal thereafter being equalized in an equalizing device, and the equalized signal then being converted in an electro-optic translating device to an optic signal with essentially maintained phase and amplitude properties. Preferably, the modulating device comprises a modulator for modulating the information carrying input signal up to an intermediate frequency which is suitable with regard to the devices forming part of the system. The modulator may accordingly be an electric modulator. In accordance with an embodiment of the invention, the equalizing device can be designed in such a way that the dispersion that has arisen will have a sign which is the opposite to that of the fibre for the information width corresponding to the signal, in particular the equalizing device may comprise a transmission wire. In accordance with another embodiment the equalizing device comprises an allpass filter. The electro-optic translating device especially translates the electric bandpass signal coming out of the equalizing device into an optic signal while maintaining phase and amplitude properties. The electro-optic translating device may especially comprise a laser, it may also comprise an external modulator. In accordance with special embodiments, the modulating device may comprise an amplitude modulator and/or an argument modulator. Alternatively, the modulating device may consist of a mixer. In this connection, the electro-optic translating device can comprise an electro-optic modulator for direct conversion from an electric intermediate frequency to an optic frequency. In that connection, the electro-optic translation device may comprise a laser diode and in particular the optic signal is transmitted to a preferably narrow optic bandpass filter which only lets through the sideband which has a sign of the dispersion which is the reverse to the dispersion of the fibre. In accordance with one embodiment, the optic filter can directly let through the information signal and the carrier wave component by which an optic carrier wave is generated, which will have the same state of polarization as the information carrying signal through the fibre. In accordance with another embodiment, the electro-optic translating device comprises two mixers and two electro-optic modulators whereby the output signal from the equalizing device is split and passes through each of the two mixers, whereby the two signals respectively are mixed with the cosine and sine, respectively, for the intermediate frequency whereupon they are lowpass filtered in a lowpass filter following each of the mixers, respectively, for obtaining the respective quadrature components on the base-band which modulates the light from a laser diode in two electro-optic modulators. In accordance with additional embodiments, the modulating device comprises a frequency modulator or a phase modulator. In that connection, especially the electro-optic translation device may comprise a frequency discriminator whereby the phase information contained in the latter is converted to an amplitude signal in the base-band. In particular, the frequency discriminator comprises a delay line demodulator for phase or frequency demodulation. In this regard, especially a signal which is converted to an amplitude signal in the base-band may small signal modulate in a laser with a linear amplitude to frequency characteristic in order to obtain an optic signal with maintained phase information. Alternatively, the electro-optic translating device may comprise a phase demodulator and an electro-optic phase demodulator whereby the phase information is directly converted to an electric base-band amplitude signal which once more, in the electro-optic phase modulator, will be converted to a phase signal with maintained characteristics on an optic carrier wave.

Through the method, the signal is preferably modulated in the modulating device up to an intermediate frequency which is adapted to the devices that form part of the system.

BRIEF DESCRIPTION OF THE DRAWINGS

The invention will now be described in more detail with reference to the accompanying drawings, with an explanatory and by no means limiting purpose, where FIG. 1 shows a general embodiment of the system arranged in the transmitter, as well as the fundamental parts thereof.

FIG. 3a, 3b, 3c illustrate signal spectra corresponding to the embodiment in accordance with FIG. 3, FIG. 4 shows an embodiment based on quadrature conversion via a base-band and FIG. 5 shows an alternative embodiment with phase or frequency modulation.

DETAILED DESCRIPTION

Figure 3:
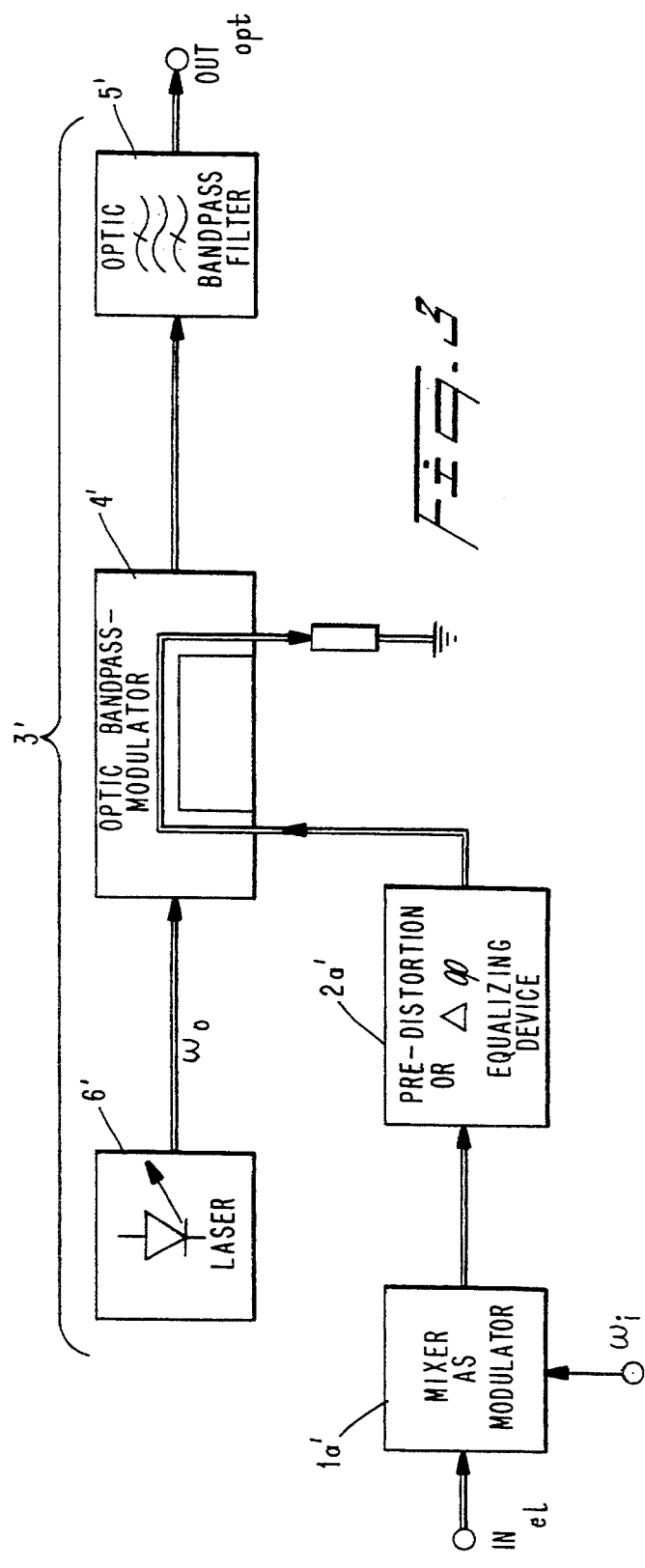
FIG. 3 illustrates an example based on the same principle as in FIG. 2.

In fibre optic systems the dispersion is usually taken into consideration as phase distortion of the second order. Phase distortion of the third order is only essential in ultra-high speed systems, that is, over 40 Gbit/s, and then only in those cases where one is very close to the dispersion-free wavelength of the fibre. Otherwise it is the second order of phase distortion which is the dominating parameter for the dispersion in the fibre.

In FIG. 1 there is shown a general embodiment of the invention where an incoming information carrying signal of for instance 10 Gbit, 7 Ghz is received in the dispersion compensation system 10. The system 10 comprises three basic blocks, of which the first one is an electric modulator 1 which modulates the information carrying signal up to a bandpass signal which has a suitable intermediate frequency $f_i$ for the following equalizing device 2, by which a correction of the phase response is made. The intermediate frequency $f_i$ is then chosen to suit the components forming part of the system, such as a modulating device 1, equalizing device 2 and translating device 3, i.e. the intermediate frequency $f_i$ is chosen through an adjustment and adaptation to the electronics and the performance of the device 1, 2, 3. In accordance with an example, the intermediate frequency would, with an input signal of approximately 10 GHz, be approximately 1,5-2 times the data transfer rate, but also up to 3 times the data transfer rate is possible or 30 GHz, but also lower values than 1,5 are possible. These constitute examples only, which furthermore only exemplify the case with an input signal of 10 Gbits. Here a number of other values are of course possible, as also the information regarding the factor 1,5-2(3) is not in any way binding, but the intermediate frequency depends on the particular case, the demands and the included components and devices. The equalizing device 2 consists in this embodiment of a transmission line or an allpass filter which has been designed so that its dispersion will have a reversed sign in relation to the fibre for the information bandwidth of the signal. The third block in the system 10 consists of an electro-optic translating device or translator 3 which serves to transform the electric bandpass signal from the equalizing device to an optical signal $(f_o)$ which is transferred to the fibre 15 generally without any information being destroyed and with maintained phase and amplitude properties. The entire system is arranged in the transmitter. The electro-optic translation device 3 may comprise a laser, an external modulator etc.

Figure 2C:
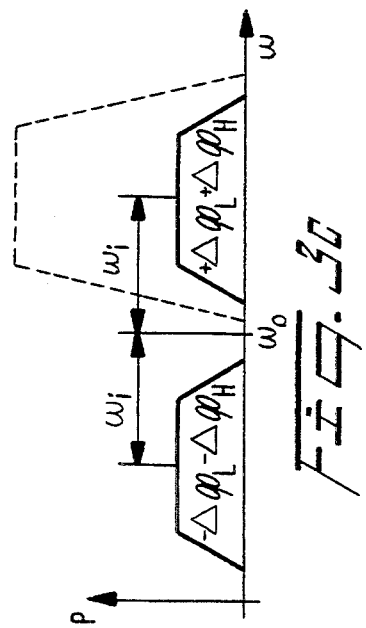
FIG. 2 shows a first embodiment of the system with a direct conversion from an electric intermediate frequency to an optical frequency.
Figure 2B:
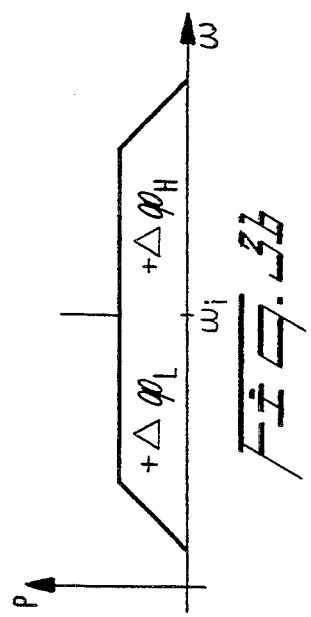
Figure 2A:
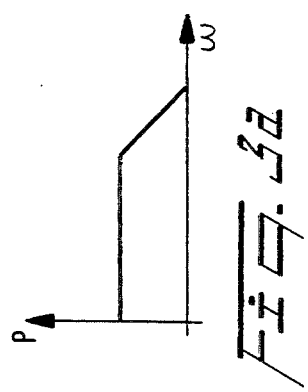

In FIG. 2 there is disclosed an embodiment which is based on direct conversion from an electric intermediate frequency to an optic frequency. In this example, the modulator 1a is formed by an amplitude and/or argument modulator or a mixer (see FIG. 3). In this the incoming information carrying signal is modulated electrically up to an intermediate frequency $f_i$. Then the signal is transmitted through a sufficiently—depending on how much dispersion is required—long transmission wire (microstrip or similar, or alternatively some other kind of allpass filter with suitable characteristics) which consequently forms the equalizing device 2a so that the signal gathers a suitable amount of dispersion (required amount) whereupon an electrically pre-distorted signal at an intermediate frequency is available. This intermediate frequency signal then directly modulates the optical carrier wave. In the example shown in FIG. 2, the translating device 3a comprises an electro-optic modulator 4 with a bandwidth of for instance 40 GHz in which the translation is made directly. The translating device 3a further comprises a laser diode 6 and an optic bandpass filter 5 through which one of the side-bands are removed, possibly also the carrier wave, without also distorting the phase response of the signal. Advantageously, the bandpass filter 5 is narrow.

In accordance with FIG. 3, the modulation of the optical carrier wave is typically carried out by an optic bandpass (BP) modulator, for instance of the kind described in Swedish patent application no. 8305572-3, which is expressly incorporated herein by reference, and in FIG. 3 the principle of the modulation is described. In accordance with a variation of the embodiment shown in FIG. 3, the optic filter 5 also lets through, in accordance with this special embodiment, the carrier wave component in order to generate an optic carrier wave which gets the same state of polarization as the information carrying signal through the fibre, which enables a self-heterodyne detection in the receiver with a possibility of further equalization at intermediate frequency level in accordance with known methods which previously have been used in heterodyne receivers.

In accordance with the example shown in FIG. 3, a mixer $1a'$ may be used as a modulator. In the optic bandpass modulator $4'$ two side bands are obtained of which one is being filtered away in the optic bandpass filter $5'$. Theoretic computations show that different signs of the phase contribution are obtained in the upper and the lower side bands respectively, from the optic bandpass modulator $4'$. The side-band having the reversed sign of the phase contribution in relation to the dispersion of the fibre must then be chosen. Since the fibre has an anomalous dispersion and the microstrip conductor, that is the equalizing device or pre-distortion device $2a$ has a normal dispersion, the upper side band must be chosen in order to achieve a dispersion compensation. In the case where the sign of the dispersion parameter is the same for the dispersion compensation as the transmission carrying medium, the lower side band must however be chosen. The filtering is carried out optically and the bandwidth of the filter must be at least as large as the signal band width for the modulating intermediate frequency signal. Suitable optic filters are available as commercial products. For instance, a so called FP filter (Fabry-Perot) can be used. In the example illustrated in FIG. 3, the signal spectra (power spectra) is also shown for the signal before it reaches the modulator $1a'$, in this case the mixer, corresponding to FIG. 3a, the signal after it has passed through the equalizing device or the pre-distortion device $2a'$ corresponding to FIG. 3b where $\omega_i (=2\pi f_i)$ relates to the intermediate frequency and finally before and after, respectively, the optic bandpass filter $5'$ corresponding to FIG. 3c where the appearance after passage of the bandpass filter is indicated within the broken line, $\omega_o$ relates to the optic frequency. $\Delta_{\phi L}$ and $\Delta_{100\,H}$ represent the phase shift which occurs for lower and higher frequencies, respectively.

Generally it can be said that the method is based on the principle of modulating, in a transmitter, the transmitted signal up to an intermediate frequency and there pre-distorting the signal in respect of the phase. After that, this intermediate frequency signal is directly modulated on the optical carrier wave by means of a bandpass modulator. The optical signal then has, as mentioned earlier, two modulation bands which both contain full information for the detection of the signal. Only one of the modulation bands will become dispersion modulated when it reaches the receiver and the other modulation band must thus be filtered away, as described earlier. In the described embodiment, the filtering takes place at the transmitter, but in principle it may also be carried out at the receiver. The described method or system can be used for so called IM, ASK, FSK and PSK signalling where IM stands for Intensity Modulation, ASK for Amplitude Shift Keying, FSK for Frequency Shift Keying and PSK for Phase Shift Keying. ASK and IM represent two systems which are identical with respect to modulation.

In FIG. 4 an alternative embodiment is described, which is based on quadrature conversion via a base-band. In this embodiment as well as the previous one, both amplitude, frequency and phase modulation can be used. As with the previous example, an information carrying electric signal reaching an amplitude and/or argument modulator 1b is modulated up to an intermediate frequency ($\omega_i$), after which the signal passes through an equalizing device 2b. After that, the signal exiting from the equalizing device is split in the electro-optic translating device 3b into two parts which are each forwarded to its two mixers 7a, 7b, in which the parts are mixed with cosine and sine respectively for the intermediate frequency, after which each signal is lowpass filtered in lowpass filters 8a, 8b corresponding to each of the parts, in order to obtain the respective quadrature components to the base-band. These quadrature components are then used to modulate the light from a laser diode (LD) in electro-optic modulators which are coupled so that the function shown in the figure is achieved. After that, the optic signal is transmitted to the fibre 15 via adding in an adder 11, for instance a direction coupler. The electro-optic system could possibly be adaptively arranged with feedback.

The embodiment shown in FIG. 5 is based on phase or frequency modulation in which the modulating device 1c is formed by a frequency or phase modulator. From this follows that all interesting information that leaves the equalizing device 2c can also be found in the phase of the signal. The equalizing device 2c can be formed of an allpass filter which turns the phase whereas it does not influence the amplitude. The electro-optic translating device 3c can in this example be designed so that the phase information in a frequency discriminator, for instance in the shape of a delay line demodulator, is converted to an amplitude signal in the base-band. This signal may then, by way of example, small signal modulate a laser with a linear amplitude to frequency characteristic in order to achieve an optic signal with maintained phase information.

Alternatively, the electro-optic translating device 3c may comprise a phase or frequency demodulator and an electro-optic phase or frequency modulator 12, 13. In that connection, phase information for instance can be directly converted to an electric base-band amplitude signal in the phase demodulator 12 which for example is designed with a locked loop. After that, the electric base-band amplitude signal will once more convert the amplitude signal in an electro-optic phase modulator 13 to a phase signal with maintained characteristics, but this time on an optic carrier wave for transmission to the fibre 15. The invention can be applied to digital as well as analog systems.

The invention is of course not limited to the described embodiments relating to systems or methods, but may be varied freely within the scope of the claims.

What is claimed is:

1. System for dispersion compensation in a transmitter in a fiber optic high speed communication system comprising:

means for modulating an electric carrier signal with an information-carrying electric signal and for generating a modulated signal;

means for equalizing the modulated signal generated by the modulating means and for generating an equalized signal; and electro-optic means for translating, substantially without loss of information and with substantially maintained phase and amplitude properties, the equalized signal generated by the equalizing means to an optical signal for transmission through an optical fiber.

2. The system of claim 1, wherein the modulating means generates a modulated signal having a predetermined intermediate frequency.

3. The system of claim 2, wherein the modulating means is an electric modulator.

4. The system of claim 3, wherein the equalizing device comprises an allpass filter.

5. The system of claim 2, wherein, for an information bandwidth corresponding to the information-carrying electric signal, the equalizing means has a dispersion having a sign that is opposite to respective dispersion in the optical fiber.

6. The system of claim 5, wherein the equalizing means comprises a transmission wire.

7. The system of claim 1, wherein the electro-optic translating means converts the equalized signal to an optical signal while maintaining the signal's phase and amplitude properties.

8. The system of claim 7, wherein the electro-optic translating means comprises a laser.

9. The system of claim 7, wherein the electro-optic translating means comprises an external modulator.

10. The system of claim 1, wherein the modulating means comprises an amplitude modulator.

11. The system of claim 10, wherein the electro-optic translating means comprises an electro-optic modulator for directly converting from an electric signal having an intermediate frequency to an optical signal.

12. The system of claim 11, wherein the electro-optic translating means comprises a laser diode.

13. The system of claim 11, wherein the electro-optic translating means includes an optical filter, and the optical signal is passed through the optical filter which has a narrow bandpass that transmits only a side band of the optical signal having a sign of dispersion that is opposite to the dispersion of the optical fiber.

14. The system of claim 13, wherein the optical filter lets through the side band of the optical signal having a sign of dispersion that is opposite to the dispersion of the optical fiber and a component of an optical carrier signal that has a state of polarization that is the same as a state of polarization of the optical signal for transmission through the optical fiber.

15. The system of claim 10, wherein the electro-optic translating means comprises a signal splitter, two mixers, two lowpass filters, two electro-optic modulators, and a laser diode; the splitter splits the equalized signal into two portions; the portions are passed through respective ones of the two mixers, which mix the portions with a cosine signal and a sine signal, respectively, thereby generating mixed signals having an intermediate frequency; the mixed signals are lowpass filtered by respective ones of the lowpass filters, thereby obtaining two baseband quadrature components; and the electro-optic modulators modulate light emitted by the laser diode with the quadrature components.

16. The system of claim 1, wherein the modulating means an argument modulator.

17. The system of claim 1, wherein the modulating means comprises an amplitude and argument modulator.

18. The system of claim 1, wherein the modulating means comprises a mixer.

19. The system of claim 1, wherein the modulating means comprises a frequency modulator.

20. The system of claim 19, wherein the electro-optic translating means comprises a frequency discriminator, and phase information in the modulated signal is converted into baseband amplitude information in the optical signal.

21. The system of claim 20, wherein the frequency discriminator comprises a delay line demodulator for phase or frequency demodulation.

22. The system of claim 21, wherein the modulated signal is a baseband amplitude signal, and the modulated signal is used to small-signal modulate a laser having linear amplitude-to-frequency-conversion characteristics, thereby obtaining an optical signal having maintained phase information.

23. The system of claim 1, wherein the modulating means comprises a phase modulator.

24. The system of claim 23, wherein the electro-optic translating means comprises a phase demodulator and an electro-optic phase modulator; phase information in the modulated signal is directly converted to an electrical baseband amplitude signal which, in the electro-optic phase modulator, is converted to a phase signal having maintained characteristics on an optical carder signal.

25. A method for dispersion compensation in fiber optic high speed communication systems in which the dispersion compensation is carried out in a transmitter, comprising the steps of:
  modulating an electric carrier signal with an information-carrying electric signal and generating a modulated signal;
  equalizing the modulated signal and generating an equalized signal; and
  converting, in an electro-optic translating device, the equalized signal to an optical signal having essentially maintained phase and amplitude properties.

26. The method of claim 25, wherein the modulated signal has a predetermined intermediate frequency.

* * * * *